(12) United States Patent
Hill et al.

(10) Patent No.: US 8,468,813 B2
(45) Date of Patent: Jun. 25, 2013

(54) SNAP-ACTION VALVE FOR EXHAUST SYSTEM

(75) Inventors: William E. Hill, Ann Arbor, MI (US); Howard C. Macaluso, Jackson, MI (US); Steven Clayton, Ypsilanti, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 323 days.

(21) Appl. No.: 12/955,199

(22) Filed: Nov. 29, 2010

(65) Prior Publication Data

US 2011/0061969 A1    Mar. 17, 2011

Related U.S. Application Data

(63) Continuation-in-part of application No. 12/139,637, filed on Jun. 16, 2008, now Pat. No. 8,215,103, which is a continuation of application No. 11/687,151, filed on Mar. 16, 2007, now Pat. No. 7,434,570.

(51) Int. Cl.
  *F01N 1/00* (2006.01)

(52) U.S. Cl.
  USPC .............................. 60/324; 181/237; 181/254

(58) Field of Classification Search
  USPC ..................................... 60/324; 181/237, 254
  See application file for complete search history.

(56) References Cited

U.S. PATENT DOCUMENTS

| | | | |
|---|---|---|---|
| 1,613,332 A | 1/1927 | Goetz | |
| 1,709,426 A * | 4/1929 | Beery | 181/254 |
| 1,832,090 A | 11/1931 | Branche | |
| 1,840,082 A * | 1/1932 | Breer | 181/254 |
| 1,860,892 A | 5/1932 | Gray | |
| 2,072,372 A * | 3/1937 | Riethmiller | 181/264 |
| 2,157,030 A * | 5/1939 | Starkweather et al. | 181/254 |
| 2,268,806 A | 1/1942 | Curtis | |
| 2,380,374 A | 7/1945 | Anderson | |
| 2,486,007 A * | 10/1949 | Culp | 137/455 |
| 2,556,277 A | 6/1951 | Hill et al. | |
| 2,855,283 A | 10/1958 | Schumacher | |
| 2,986,373 A | 5/1961 | Masheder | |
| 3,020,980 A | 2/1962 | Baker et al. | |

(Continued)

FOREIGN PATENT DOCUMENTS

| | | |
|---|---|---|
| EP | 1045180 | 10/2000 |
| JP | 1997-303143 A | 11/1997 |

(Continued)

*Primary Examiner* — Thomas Denion
*Assistant Examiner* — Matthew T Largi
(74) *Attorney, Agent, or Firm* — Harness, Dickey & Pierce, P.L.C.

(57) ABSTRACT

A muffler for an internal combustion engine exhaust system includes a housing having an inlet and outlet headers enclosing opposite ends of an outer shell. A partition divides a housing interior into first and second chambers, the first chamber having sound absorbing material positioned therein. The partition has an aperture allowing fluid communication between the first and second chambers. A through pipe extends through the inlet and outlet headers and the partition and has a plurality of perforations enabling fluid communication between the through pipe and the first chamber. A valve assembly has a valve flap positioned inside the through pipe for rotation with an axle pivotally coupled to the pipe between a closed position and an open position. The valve is positioned downstream of the pipe perforations such that all of an exhaust gas flowing through the muffler passes through the valve regardless of the valve flap position.

27 Claims, 9 Drawing Sheets

U.S. PATENT DOCUMENTS

| | | | |
|---|---|---|---|
| 3,406,783 A | | 10/1968 | Haffer |
| 3,625,249 A | | 12/1971 | Karr |
| 3,703,937 A | | 11/1972 | Tenney |
| 4,030,651 A | * | 6/1977 | Weiss et al. .................. 226/97.4 |
| 4,264,344 A | * | 4/1981 | Ludecke et al. ................ 55/313 |
| 4,356,801 A | | 11/1982 | Graham |
| 4,378,003 A | | 3/1983 | Imamura |
| 4,396,034 A | | 8/1983 | Cherniak |
| 4,541,506 A | | 9/1985 | Venning et al. |
| 4,563,605 A | | 1/1986 | Gerber |
| 4,565,176 A | | 1/1986 | Alf et al. |
| 4,707,987 A | | 11/1987 | Atkin |
| 4,805,571 A | | 2/1989 | Humphrey |
| 4,825,983 A | | 5/1989 | Nakanishi |
| 4,903,486 A | | 2/1990 | Finkle |
| 5,044,396 A | | 9/1991 | Daudet et al. |
| 5,355,673 A | * | 10/1994 | Sterling et al. ................. 60/324 |
| 5,392,812 A | | 2/1995 | Herron |
| 5,581,056 A | | 12/1996 | Bellgardt et al. |
| 5,633,482 A | * | 5/1997 | Erion et al. .................... 181/282 |
| 5,692,374 A | | 12/1997 | Seki et al. |
| 5,723,829 A | | 3/1998 | Inomata et al. |
| 5,739,483 A | * | 4/1998 | Yashiro et al. ................ 181/254 |
| 5,744,762 A | | 4/1998 | Seki et al. |
| 5,749,335 A | | 5/1998 | Flanery et al. |
| 5,773,770 A | | 6/1998 | Jones |
| 5,813,380 A | | 9/1998 | Takahashi et al. |
| 5,821,474 A | | 10/1998 | Olszok et al. |
| 5,839,489 A | | 11/1998 | Ganachaud et al. |
| 5,931,052 A | | 8/1999 | Zhao et al. |
| 5,971,098 A | | 10/1999 | Suzuki et al. |
| 5,971,859 A | | 10/1999 | Runge et al. |
| 5,984,045 A | | 11/1999 | Maeda et al. |
| 6,189,650 B1 | | 2/2001 | Inuzuka et al. |
| 6,193,214 B1 | | 2/2001 | Schatz |
| 6,332,442 B1 | | 12/2001 | Komada et al. |
| 6,499,562 B1 | | 12/2002 | Elfinger et al. |
| 6,527,006 B2 | | 3/2003 | Jackson |
| 6,536,567 B2 | | 3/2003 | Nakanishi |
| 6,553,963 B1 | | 4/2003 | Noble |
| 6,564,902 B1 | * | 5/2003 | Saberi .......................... 181/237 |
| 6,598,390 B2 | | 7/2003 | Chang |
| 6,604,516 B1 | | 8/2003 | Krimmer et al. |
| 6,637,545 B1 | | 10/2003 | Jonsson et al. |
| 6,640,927 B1 | | 11/2003 | Turner |
| 6,732,511 B2 | | 5/2004 | Unbehaun et al. |
| 7,182,171 B2 | | 2/2007 | Weinert et al. |
| 7,201,142 B2 | | 4/2007 | Peffley et al. |
| 7,434,570 B2 | | 10/2008 | Hill |
| 2004/0178015 A1 | | 9/2004 | Wiemeler et al. |
| 2006/0272322 A1 | * | 12/2006 | Abram et al. .................. 60/324 |
| 2008/0223025 A1 | | 9/2008 | Hill |
| 2008/0224083 A1 | | 9/2008 | Hill |
| 2008/0245063 A1 | | 10/2008 | Hill |
| 2009/0126358 A1 | * | 5/2009 | Abram et al. .................. 60/324 |
| 2009/0127023 A1 | | 5/2009 | Abram et al. |

FOREIGN PATENT DOCUMENTS

| | | |
|---|---|---|
| JP | 1998-141041 A | 5/1998 |
| JP | 2000-002112 | 1/2000 |
| JP | 2002-235536 | 8/2002 |
| JP | 2002-303120 | 10/2002 |
| JP | 2003-227326 | 8/2003 |
| JP | 2006-322411 | 11/2006 |
| KR | 10-1998-0002656 A | 3/1998 |
| KR | 10-1998-0009780 A | 4/1998 |
| KR | 10-2001-0038902 | 5/2001 |
| KR | 10-2001-0038902 A | 5/2001 |
| KR | 10-0916809 | 9/2009 |
| WO | WO2008-115212 | 9/2008 |

\* cited by examiner

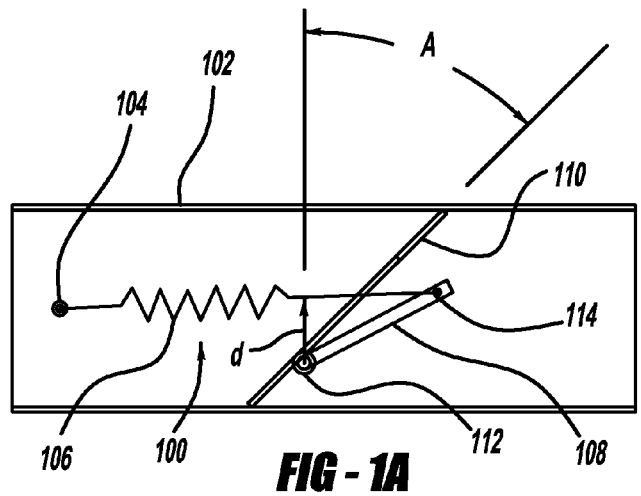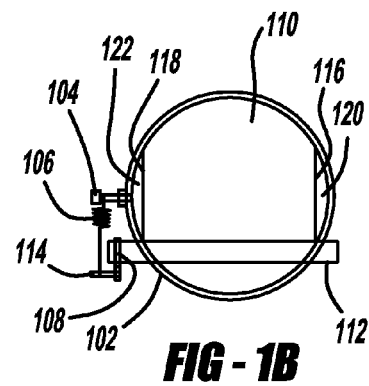
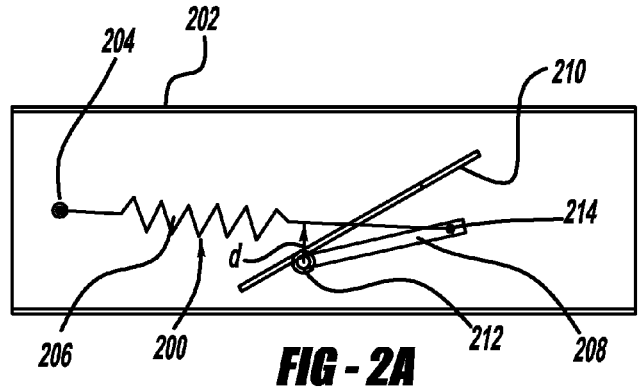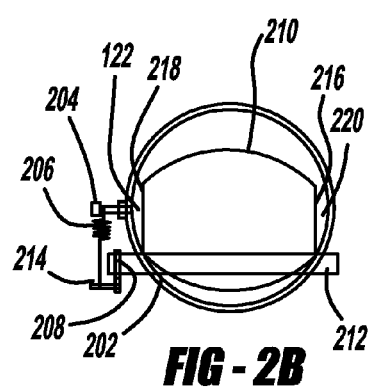
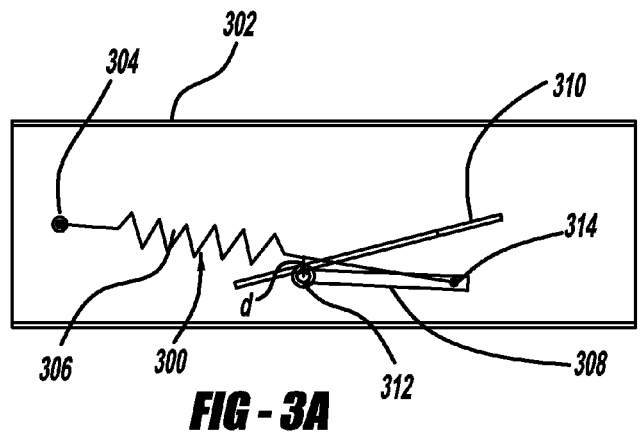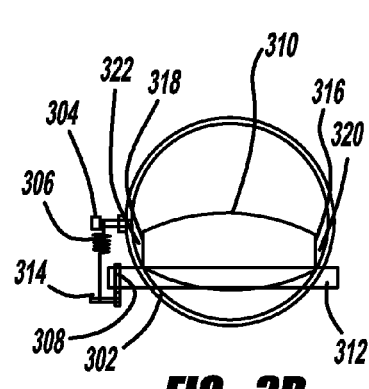

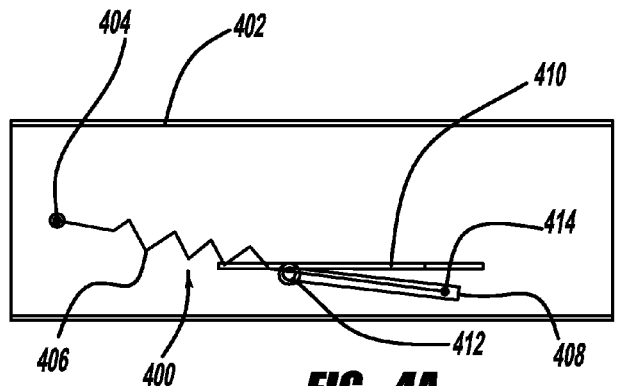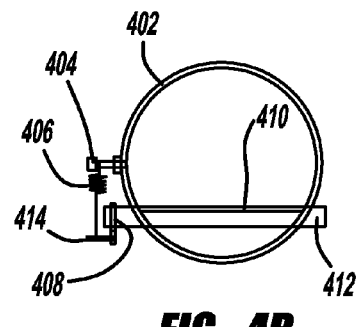
*FIG - 4A*  *FIG - 4B*
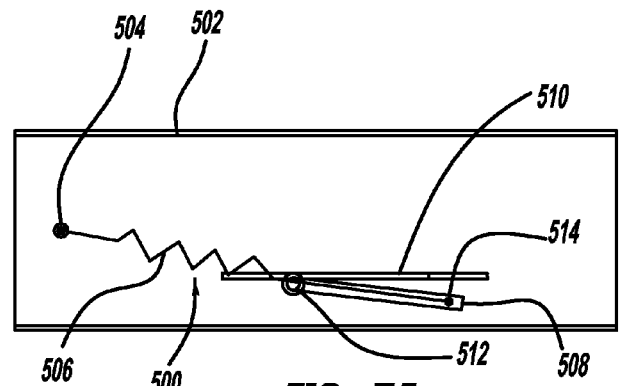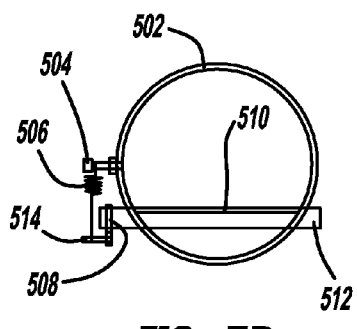
*FIG - 5A*  *FIG - 5B*
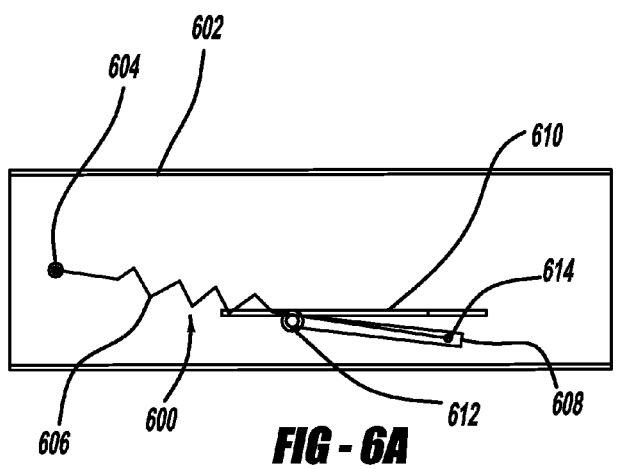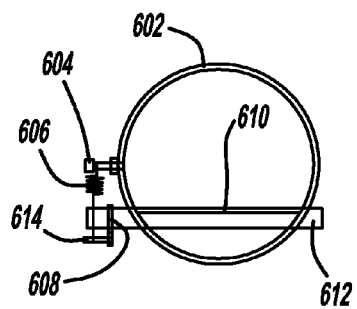
*FIG - 6A*  *FIG - 6B*

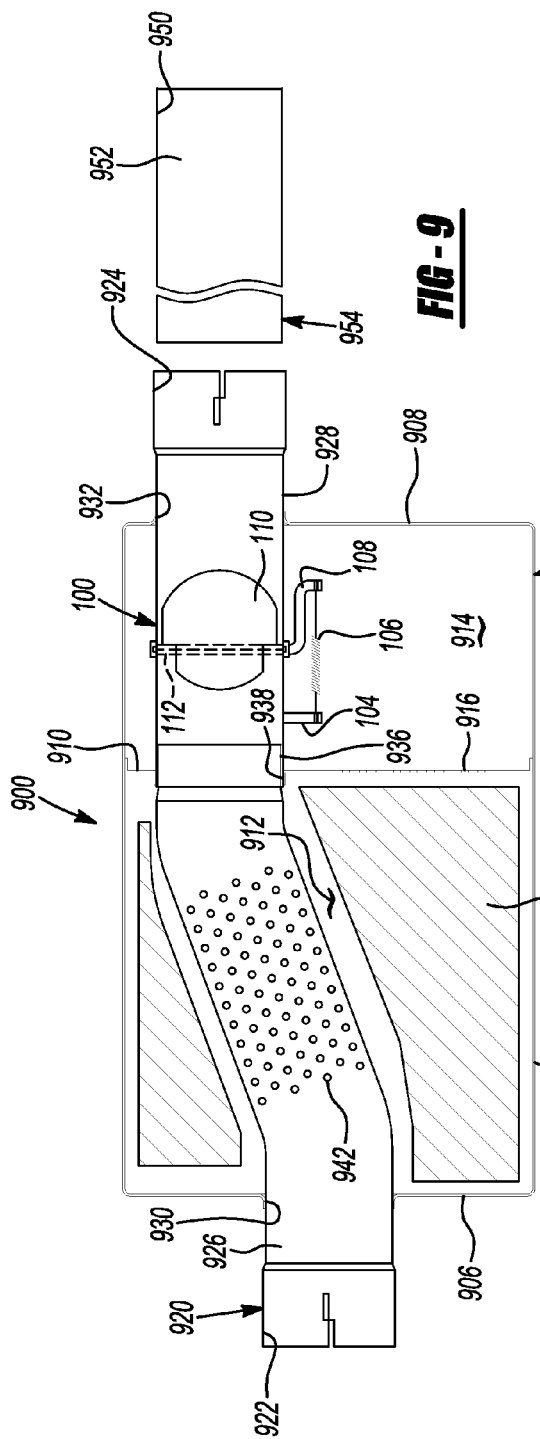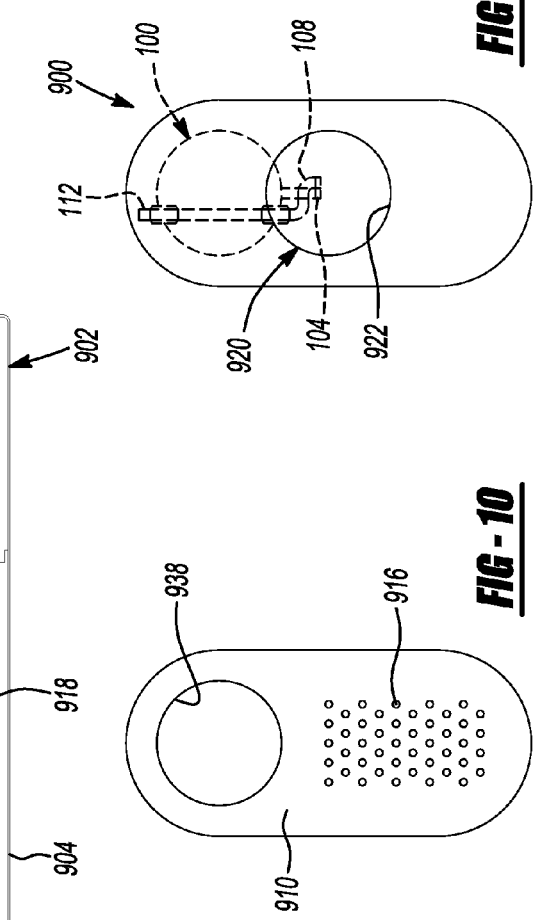

SNAP-ACTION VALVE FOR EXHAUST SYSTEM

CROSS REFERENCE TO RELATED APPLICATION

This application is a continuation-in-part of U.S. Application Ser. No. 12/139,637, filed Jun. 16, 2008, which is a continuation of U.S. Application Ser. No. 11/687,151, filed Mar. 16, 2007, now issued U.S. Pat. No. 7,434,570. The entire disclosures of each of the above applications are incorporated herein by reference.

BACKGROUND

The disclosure generally relates to valve arrangements for vehicle exhaust systems. More specifically, the present teachings pertain to passive flapper valves for exhaust conduits.

Many exhaust systems have attempted to use both active and passive valve assemblies to alter the characteristics of exhaust flow through a conduit as the exhaust pressure increases due to increasing engine speed. Active valves carry the increased expense of requiring a specific actuating element, such as a solenoid. Passive valves utilize the pressure of the exhaust stream in the conduit with which the valve is associated.

Traditionally, even passive valves at their lower expense give rise to problems of unwanted back pressure when the valve is open. There is seen to be a need in the art for a passive valve arrangement which may be utilized totally inside a conduit, which is relatively inexpensive, and is capable of assuming a fully open position which minimizes unwanted back pressure.

SUMMARY

Accordingly, an exhaust pressure actuated valve assembly for placement inside a tubular exhaust conduit includes a valve flap having first and second arcuate edges substantially conforming to curved portions of the exhaust conduit, and first and second linear edges extending between the first and second arcuate edges and providing clearance between the valve flap and an inner surface of the conduit. An axle adapted to pivotally couple the valve flap to the exhaust conduit about a longitudinal axis of the axle is coupled to the valve flap between the first and second arcuate edges such that unequal surface areas of the valve flap lie on either side of the axle. The axle further includes a protrusion at one end thereof adapted to be positioned exteriorly of the exhaust conduit. A bias element is adapted to be coupled between the exhaust conduit and the axle protrusion and is operative to bias the valve flap toward a closed position wherein the first and second arcuate edges of the valve flap contact curved portions of the exhaust conduit. Exhaust pressure may be of a magnitude overcoming a bias force of the bias element to force the valve flap to a fully opened position within the conduit wherein the first and second linear edges of the valve flap contact an inner surface of the valve conduit and are substantially parallel to the longitudinal axis of the conduit.

In a further aspect of the disclosed teachings, a muffler for an internal combustion engine exhaust system includes a housing having an outer shell, inlet and outlet headers closing opposite ends of the shell and a partition inside the housing dividing it into first and second chambers. The partition has at least one aperture therethrough providing for fluid communication between the first and second chambers. A through pipe extends through the inlet and outlet headers and the partition and has a first plurality of perforations enabling fluid communication between the through pipe and the first chamber and a second plurality of perforations enabling fluid communication between the through pipe and the second chamber. A valve assembly having a valve flap is positioned inside the through pipe between the first and second pluralities of through pipe perforations. The valve flap rotates about an axle pivotally coupled to the pipe between a fully closed position wherein a first peripheral portion of the valve flap is in contact with an inner surface of the through pipe and a fully opened position wherein a plane of the valve flap is substantially parallel to a longitudinal axis of the through pipe and a second peripheral portion of the valve flap is in contact with an inner surface of the through pipe.

In still a further aspect of the disclosed teachings, a fluid flow pressure actuated valve assembly for placement inside a tubular conduit includes a valve flap having a first peripheral portion adapted to be in contact with an inner surface of the conduit when the flap is in a full closed position and a second peripheral portion in contact with the inner surface of the conduit in a full open position. An axle is adapted to pivotally couple the valve flap to the conduit about a longitudinal axis of the axle, the axle coupled to the valve flap asymmetrically with respect to a surface area of the valve flap, the axle including a protrusion adapted to be positioned outside the conduit. A bias element is adapted to be coupled between the conduit and the protrusion and is operative to urge the valve flap toward the full closed position.

A muffler for an internal combustion engine exhaust system includes a housing having an inlet and outlet headers enclosing opposite ends of an outer shell. A partition divides a housing interior into first and second chambers, the first chamber having sound absorbing material positioned therein. The partition has an aperture allowing fluid communication between the first and second chambers. A through pipe extends through the inlet and outlet headers and the partition and has a plurality of perforations enabling fluid communication between the through pipe and the first chamber. A valve assembly has a valve flap positioned inside the through pipe for rotation with an axle pivotally coupled to the pipe between a closed position and an open position. The valve is positioned downstream of the pipe perforations such that all of an exhaust gas flowing through the muffler passes through the valve regardless of the valve flap position.

A muffler for an internal combustion engine exhaust system includes a housing having an outer shell, and inlet and outlet headers enclosing opposite ends of the shell. A partition divides a housing interior into a first chamber extending from the inlet header to the partition and a second chamber extending from the partition to the outlet header. A through pipe extends through the inlet and outlet headers and the partition and has a plurality of perforations enabling fluid communication between the through pipe and the first chamber. The portion of pipe extending through the second chamber is devoid of perforations. A valve assembly has a substantially planar valve flap positioned inside the through pipe with an axle pivotally coupled to the pipe. The valve flap is rotatable between a closed position and an open position whereat a plane of the valve flap is substantially parallel to a longitudinal axis of the through pipe. The valve is positioned within the second chamber downstream of the pipe perforations to separate the first and second chambers from the pipe downstream of the valve when the valve is closed.

A muffler for an internal combustion engine exhaust system includes a housing having an outer shell, and inlet and outlet headers enclosing opposite ends of the shell. An inlet pipe extends through the inlet header. A first outlet pipe extends through the outlet header. A second outlet pipe extends through one of the inlet and outlet headers. First and second valve assemblies each include a planar valve flap positioned inside the first and second outlet pipes, respectively, for rotation with an axis pivotally coupled to the respective outlet pipe. The valve flap is rotatably between a closed position and an open position whereat a plane of the valve flap is substantially parallel to a longitudinal axis of the outlet pipe in which the valve is positioned. The first and second valves are positioned such that all of an exhaust gas flowing through the muffler passes through the valves.

A muffler for an internal combustion engine exhaust system includes a housing having an outer shell, and inlet and outlet headers enclosing opposite ends of the shell. An inlet pipe extends through the inlet header and has a plurality of perforations enabling fluid communication between the inlet pipe and an interior of the housing. A partition inside the housing divides the housing interior into first and second chambers. The first chamber includes sound absorbing material positioned therein. The partition has at least one aperture therethrough for providing fluid communication between the first and second chambers. First and second outlet pipes extend through the outlet header where each of the outlet pipes includes an upstream end coupled in fluid communication with a downstream end of the inlet pipe. A valve assembly has a substantially planar valve flap positioned inside the inlet pipe for rotation with an axle pivotally coupled to the inlet pipe. The valve flap is rotatable between a closed position and an open position whereat the valve flap is substantially parallel to a longitudinal axis of the inlet pipe.

BRIEF DESCRIPTION OF THE DRAWING

The objects and features of the disclosed teaching will become apparent from a reading of the detailed description, taken in conjunction with the drawing, in which:

FIGS. 1A, 1B are respective side and end views of a valve controlling fluid flow through a conduit, the valve being in a closed position and arranged in accordance with the disclosed teachings;

FIGS. 2A, 2B are respective side and end views of the valve of FIGS. 1A, 1B in a 15° open position;

FIGS. 3A, 3B are respective side and end views of the valve of FIGS. 1A, 1B in a 30° open position;

FIGS. 4A, 4B are respective side and end views of the valve of FIGS. 1A, 1B in a fully open position;

FIGS. 5A, 5B are respective side and end views of a first valve axle arrangement in accordance with the present teachings;

FIGS. 6A, 6B are respective side and end views of a second valve axle arrangement in accordance with the present teachings;

FIG. 9 is a cross-sectional view of another exhaust muffler arranged with the valve of FIGS. 1A, 1B in accordance with the present teachings;

FIG. 10 is a plan view of a partition within the muffler of FIG. 9;

FIG. 11 is an end view of the muffler shown in FIG. 9;

DETAILED DESCRIPTION

Figure 7:
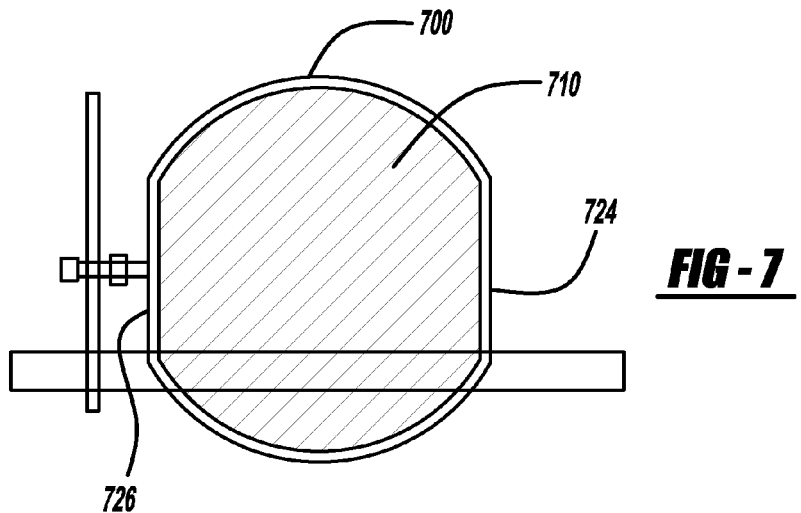
FIG. 7 is an end view of the valve of FIGS. 1A and 1B with the pipe contacting the valve flap altered to achieve substantially full blockage of the pipe when the valve is placed in the fully closed position.

With reference to FIGS. 1A-4B, side and end views of a valve assembly with a valve flap in various operative positions is shown in side and end views of the conduit in which the valve assembly is positioned. Identical elements among these Figures carry the same last two designation numerals.

An exhaust conduit 102 contains a snap-action valve 100 which includes a spring anchor 104, a valve spring 106, an external lever arm 108, a valve flap 110, a valve support shaft or axle 112 and a spring attachment arm 114 protruding from axle 112.

Valve flap 110 has first and second arcuate edges substantially conforming to an interior arcuate surface of conduit 102. Flapper 110 additionally has linear side edges 116 and 118 which provide clearance 120, 122 between flapper 110 and an interior surface of conduit 102 when the flap is in the closed position shown in FIGS. 1A and 1B. Bias element or spring 106 extends between an anchor point 104 on conduit 102 and attachment point 114 of external lever arm 108. Spring 106 biases flapper 110 toward the closed position shown in FIG. 1A. When in the fully closed position, flap 110 resides at an angle other than 90° to a plane extending normal to the longitudinal axis of conduit 102. The angle of the flap with respect to a cross-sectional normal plane of conduit 102 is designated A.

In operation, exhaust pressure is incident on flap 110 from the left as viewed in FIGS. 1A-4B. When the exhaust pressure is sufficient to overcome the bias force of spring 106, the flap 110 will start to rotate about axle 112. The torque on valve flap 110 is determined by the bias spring force multiplied by the distance d which is the distance d between the axis of the spring and axle 112. The spring force increases as the valve flap opens and the spring 106 stretches. However, d gets shorter as the valve continues to open resulting in the torque approaching zero as the longitudinal axis of the spring approaches an "over-center" position—i.e., as it approaches intersection with a longitudinal axis of the axle 112. This nearly over-center positioning of the valve flap as shown at 410 in FIG. 4A and FIG. 4B results in a substantially horizontal position of the flap when in the fully open position. This positioning, in turn, minimizes back pressure in the conduit when the valve is in the fully open position. Additionally, it is to be noted that the conduit itself supplies the stop mechanism for the valve flap in both its fully closed and fully opened positions. In the fully closed position, the arcuate edges of flap 114 contact the interior surface of conduit 102 to define that position. Conversely, when in the fully opened position, as shown in FIGS. 4A and 4B, flap 410 utilizes its lateral linear edges (116 and 118 of FIG. 1B) to come into contact with the inner surface of conduit 402 to thereby provide a stop position for the fully opened position of flap 410.

Rotating the valve flap such that the spring approaches the over-center condition also results in an easier maintenance of the valve in the fully opened position.

FIGS. 5A and 5B show a first axle arrangement suitable for use with the valve assembly disclosed herein. Valve flap 510 rotates within conduit 502 about axle 512 which is placed asymmetrically with respect to the plane of flap 510. A bias spring 506 extends between anchor point 504 and an attachment point 514 on lever arm 508. As seen from FIG. 5B, axle 512 which is journaled to conduit 502 via appropriate apertures, extends only so far at its leftmost end as shown in FIG. 5B so as to provide clearance between the axle 512 and spring 506. With this clearance, the spring goes to near over-center and holds that position until the exhaust flow pressure is reduced significantly. At that point, the valve flap snaps to the closed position. Lever arm 508 protrudes from axle 512 either as a separately attachable element or as an integral protrusion of axle 512.

FIGS. 6A and 6B depict an alternative axle arrangement for use with the valve assembly disclosed. In this arrangement axle 612 extends outwardly of the conduit for a distance sufficient that it intersects the ultimate location of spring 606 when in its fully extended position. Hence, in this arrangement, spring 606 will contact axle 612 and wrap around it when the fully opened position is achieved. With this arrangement, since spring 606 wraps around axle 612, the spring will pull the flap 610 to the closed position as soon as the exhaust flow pressure is reduced to a level unable to overcome the spring force.

FIG. 7 depicts one approach to achieving nearly full closure of the exhaust conduit by the disclosed valve assembly when the valve flap is put in its fully closed position. As seen from FIG. 7, clearance areas such as 120 and 122 of FIG. 1B are substantially eliminated by flattening sides of conduit 700 such that it conforms more nearly to the overall peripheral shape of valve flap 710. Section 724 and section 726 are flattened areas of conduit 700 to more nearly parallel the linear first and second edges of valve flap 710. Of course it will be apparent to those skilled in the art that some clearance between the linear edges of valve flap 710 and conduit walls 724 and 726 must be present to prevent jamming of the valve flap upon rotating.

Figure 8:
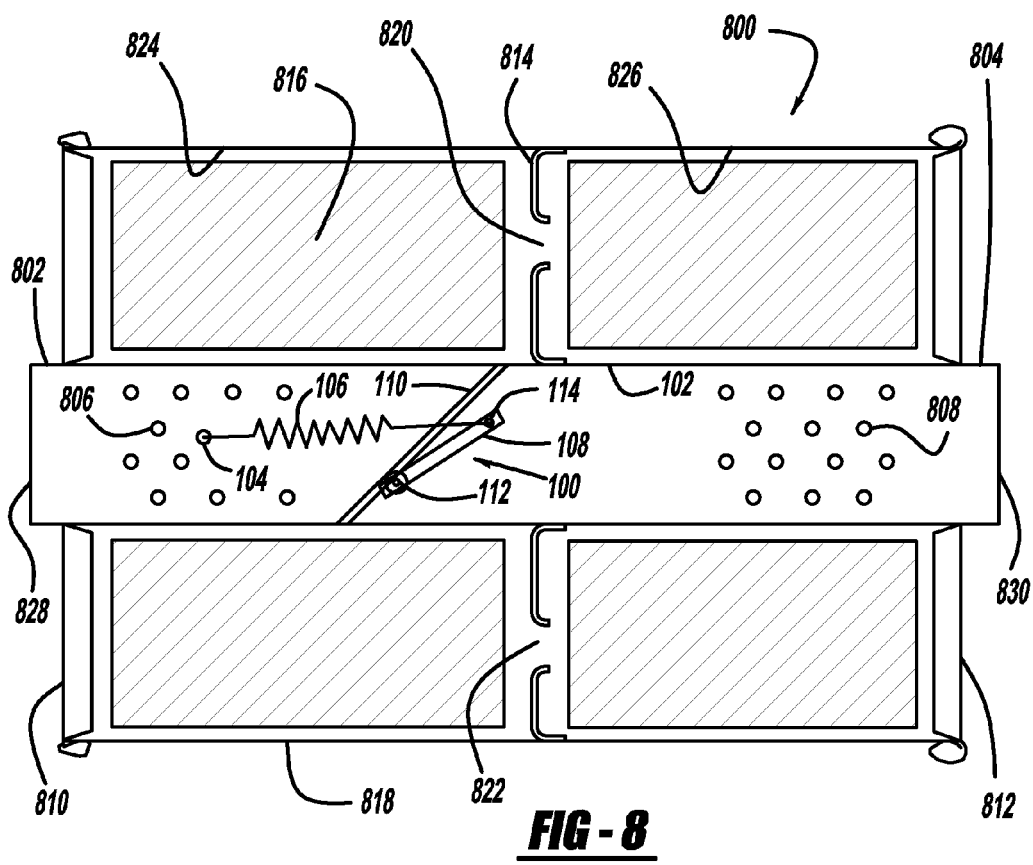
FIG. 8 is a cross-sectional view of an exhaust muffler arranged with the valve of FIGS. 1A, 1B in accordance with the present teachings.

An exemplary application of the disclosed valve assembly is for an automotive exhaust system muffler, such as that shown in FIG. 8.

Muffler 800 has a housing comprised of a substantially cylindrical outer shell 818 closed at inlet and outlet ends by an inlet header 810 and an outlet header 812. A partition 814 is attached to outer shell 818 at a position to define muffler chambers 824 and 826 on either side thereof. Partition 814 additionally includes at least one aperture 820, 822 enabling fluid communication between the chambers 824 and 826 inside muffler 800. Optionally, sound absorbing material 816 may be placed in one or both interior muffler chambers.

Extending through muffler 800 by passing through inlet header 810, partition 814 and outlet header 812 is a through pipe 802. Pipe 802 includes a first plurality of perforations 806 enabling an inlet section of pipe 802 to have fluid communication with the muffler chamber 824 surrounding it. Pipe 802 has a second plurality of perforations 808 at an outlet end enabling fluid communication from the chamber 826 surrounding it to pipe 802.

Positioned between the first and second set of perforations of pipe 802 is a valve assembly 100 arranged as previously described in conjunction with FIGS. 1A-4B. Hence, in the closed position of valve assembly 100, exhaust will enter muffler 800 at the inlet end 828 of pipe 802 as seen in FIG. 8 and will flow through perforations 806 into the sound absorbing material 816 surrounding the pipe in chamber 824. The exhaust then flows from the first chamber 824 to the second chamber 826 via apertures 820, 822 in partition 814. Finally, the exhaust flows from the second chamber 826 through perforations 808 in through pipe 802 and out an exit end 830 of the pipe 802 as seen from FIG. 8.

When the exhaust pressure is high enough to overcome the force of bias spring 106, the valve flap 110 will open to a nearly horizontal position within pipe 802 to essentially have most of the exhaust gas bypass the first and second chambers and their associated sound absorbing material. Since the flap 110 will be substantially horizontal in FIG. 8 in the fully open position, back pressure in muffler 800 is minimized.

Another exemplary application of the disclosed valve assembly includes an automotive exhaust system muffler 900, such as that shown in FIG. 9.

Muffler 900 includes a housing 902 including an outer shell 904 having a substantially oval cross-sectional shape closed at inlet and outlet ends by an inlet header 906 and an outlet header 908. A partition 910 is attached to outer shell 904 at a position to define a first muffler chamber 912 between inlet header 906 and partition 910. A second muffler chamber 914 is defined as the volume between partition 910 and outlet header 908. Partition 910 includes a plurality of apertures 916 extending therethrough enabling fluid communication between first chamber 912 and second chamber 914 within muffler 900. A sound absorbing material such as fiberglass roving 918 may be positioned within first chamber 912. No sound absorbing material is placed within second chamber 914.

A pipe 920 includes an inlet 922 and an outlet 924. In the example depicted in FIG. 9, pipe 920 includes an inlet section 926 coupled to an outlet section 928. Inlet header 906 includes an aperture 930 in receipt of inlet section 926. Similarly, outlet header 908 includes an aperture 932 in receipt of outlet section 928. Inlet section 926 is bent such that inlet 922 may be aligned with a central longitudinal axis of housing 902 while outlet 924 is transversely offset from the central longitudinal axis. Inlet section 926 includes a reduced diameter portion 936 positioned within outlet section 928. Partition 910 includes an aperture 938 in receipt of pipe 920. An overlapping joint between inlet section 926 and outlet section 928 is aligned with and supported by partition 910.

Pipe inlet section 926 includes a plurality of apertures 942 positioned providing fluid communication between inlet 922 of inlet section 926 and first muffler chamber 912.

Valve assembly 100, as previously described in conjunction with FIGS. 1A-4B, is positioned within outlet section 928 of pipe 920 at a position proximate outlet header 908. More particularly, when valve flap 110 is in the closed position, exhaust will enter inlet 922, pass through apertures 942, enter first muffler chamber 912, pass through apertures 916 and enter second muffler chamber 914. While valve 100 is closed, a relatively small volume flow rate passes through a gap or passageway between valve flap 110 and an inner surface of outlet section 928. The small passageway around valve flap 110 functions to absorb low frequencies within the exhaust flow. Because outlet section 928 is a closed cylindrical member, exhaust does not flow through first chamber 912 and second chamber 914. Acoustical waves are present but the volume flow rate of exhaust through first chamber 912 and second chamber 914 is minimal. Sound absorbing material 918 functions to attenuate noise regardless of the position of valve flap 110.

When the exhaust pressure is high enough to overcome the force of bias spring 106, valve flap 110 rotates toward an open position. At a fully open position, valve flap 110 extends substantially horizontally within pipe 920 to minimize back pressure in muffler 900. It should be appreciated that since no sound absorbing material is placed within second chamber 914, no interference between sound absorbing material 918 and valve assembly 100 occurs.

An upstream end 954 of tail pipe 952 is coupled in fluid communication with outlet 924 of outlet section 928. Tail pipe 952 includes an open end or outlet 950 in communication with the atmosphere. Resonance may exist within tail pipe 952 and the portion of outlet section 928 that is downstream from valve 100 due to the standing exhaust waves that are formed in this portion of the exhaust system. Regardless of the angular position of valve flap 110, one hundred percent of the exhaust flows through valve assembly 100. As such, the axial position of valve assembly 100 may be defined to minimize resonance that may occur within tail pipe 952 and muffler 900. By positioning valve flap 110 at a location downstream from apertures 942, first chamber 912 and second chamber 914 are isolated from the tail pipe. Undesirable resonance or "drone" are avoided.

In previous systems, outlet 950 of tail pipe 952 was placed in open fluid communication with an expanded volume inside muffler shell 904. The expanded volume functioned to amplify and/or further excite a resonant condition within the tail pipe leading to undesirable noise. Positioning valve flap 110 downstream from the expanded volume within muffler 900 separates the relatively long standing waves within tail pipe 952 from enlarged volumes within shell 904. Undesirable noise and drone are not amplified.

Valve 100 is positioned at the upstream end of tail pipe 952 separating portions of the exhaust system having greatly different cross-sectional areas. For example, the cross-sectional area of second chamber 914 may be greater than or equal to three times the cross-sectional area of tail pipe 952. Nodes of the standing waves formed within tail pipe 952 will be located at outlet 950 and at valve flap 110. By positioning valve 100 in this manner, resonance of all frequencies formed within tail pipe 952 will be minimized.

To optimize the noise attenuation function of valve 100, the valve is positioned proximate outlet header 908. More particularly, axle 112 is axially spaced from outlet header 908 a distance less than or equal to one-quarter the distance between inlet header 906 and outlet header 908.

FIGS. 12-16 depict mufflers having a single inlet, two outlets and at least one passive snap-action valve. At times, vehicle manufacturers may configure exhaust systems to combine the exhaust from each one of the engine cylinders in a single manifold or pipe. The single pipe rearwardly extends in fluid communication with an inlet pipe of a muffler assembly. From the muffler location rearward, the exhaust is split into two or more tail pipes. The mufflers of FIGS. 12-16 may be used in this application.

Figure 12:
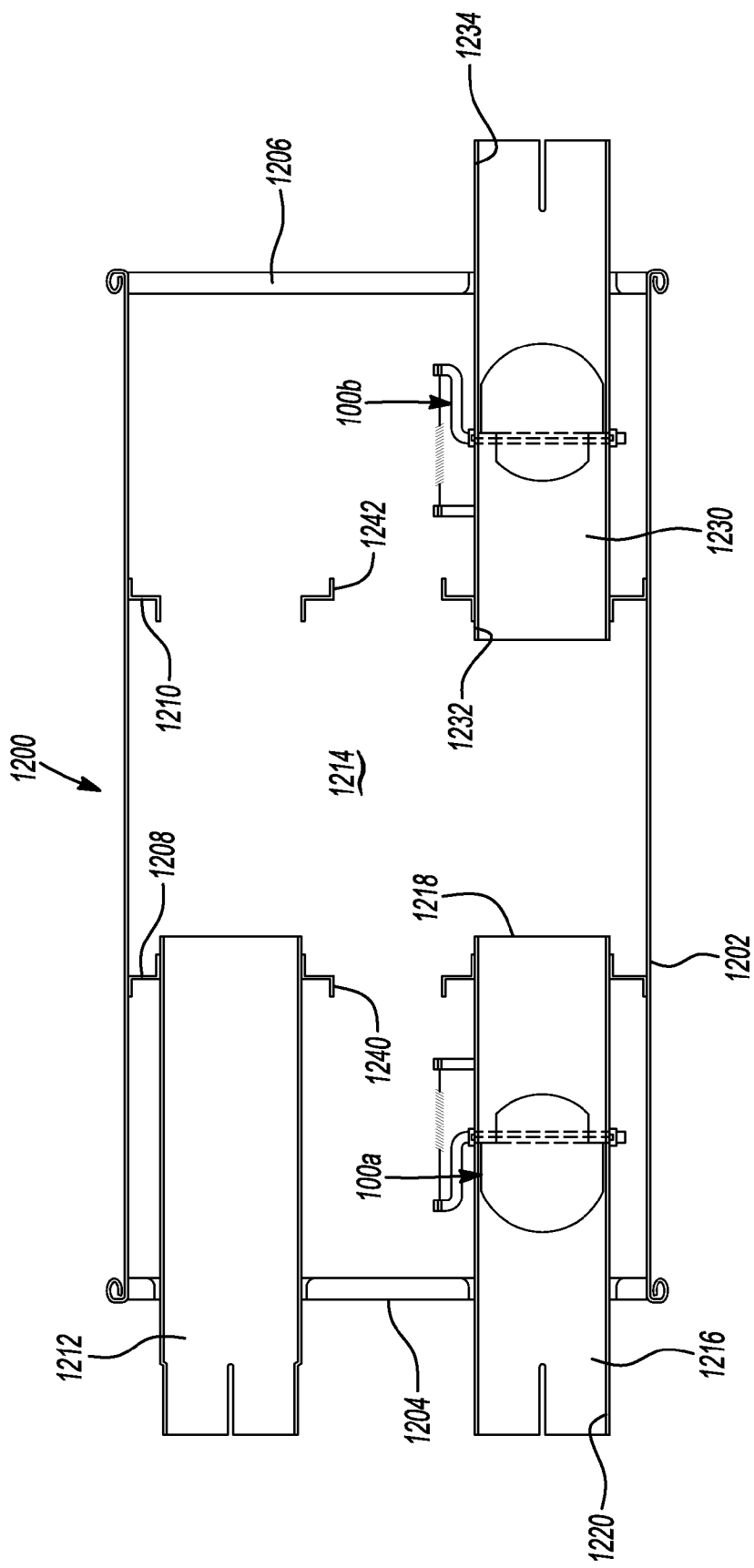
FIG. 12 is a cross-sectional view of an exhaust muffler having a single inlet, dual outlets and a valve constructed in accordance with the teachings of the present disclosure.

FIG. 12 depicts a muffler 1200 including a housing 1202, an inlet header 1204, an outlet header 1206, a first partition 1208 and a second partition 1210. An inlet pipe 1212 extends through inlet header 1204 and first partition 1208 to provide exhaust from an internal combustion engine to a chamber 1214. A first outlet pipe 1216 extends through inlet header 1204 and first partition 1208. A first open end 1218 of first outlet pipe 1216 is in fluid communication with chamber 1214. First outlet pipe 1216 includes an outlet 1220 in communication with the atmosphere. A first valve assembly 100*a* is positioned within first outlet pipe 1216. A second outlet pipe 1230 extends through outlet header 1206 and second partition 1210. A first open end 1232 of second outlet pipe 1230 is in fluid communication with chamber 1214. A second open end 1234 is in fluid communication with the atmosphere. A second valve 100*b* is positioned within second outlet pipe 1230. Valves 100*a* and 100*b* are substantially similar to valve 100 previously described. Muffler 1200 is arranged to facilitate mounting a muffler such that each of the inlet and outlet pipes extend transversely across the vehicle. First partition 1208 and second partition 1210 include apertures 1240 and 1242, respectively. As such, chamber 1214 extends the entire length of housing 1202 from inlet header 1204 to outlet header 1206.

Figure 13:
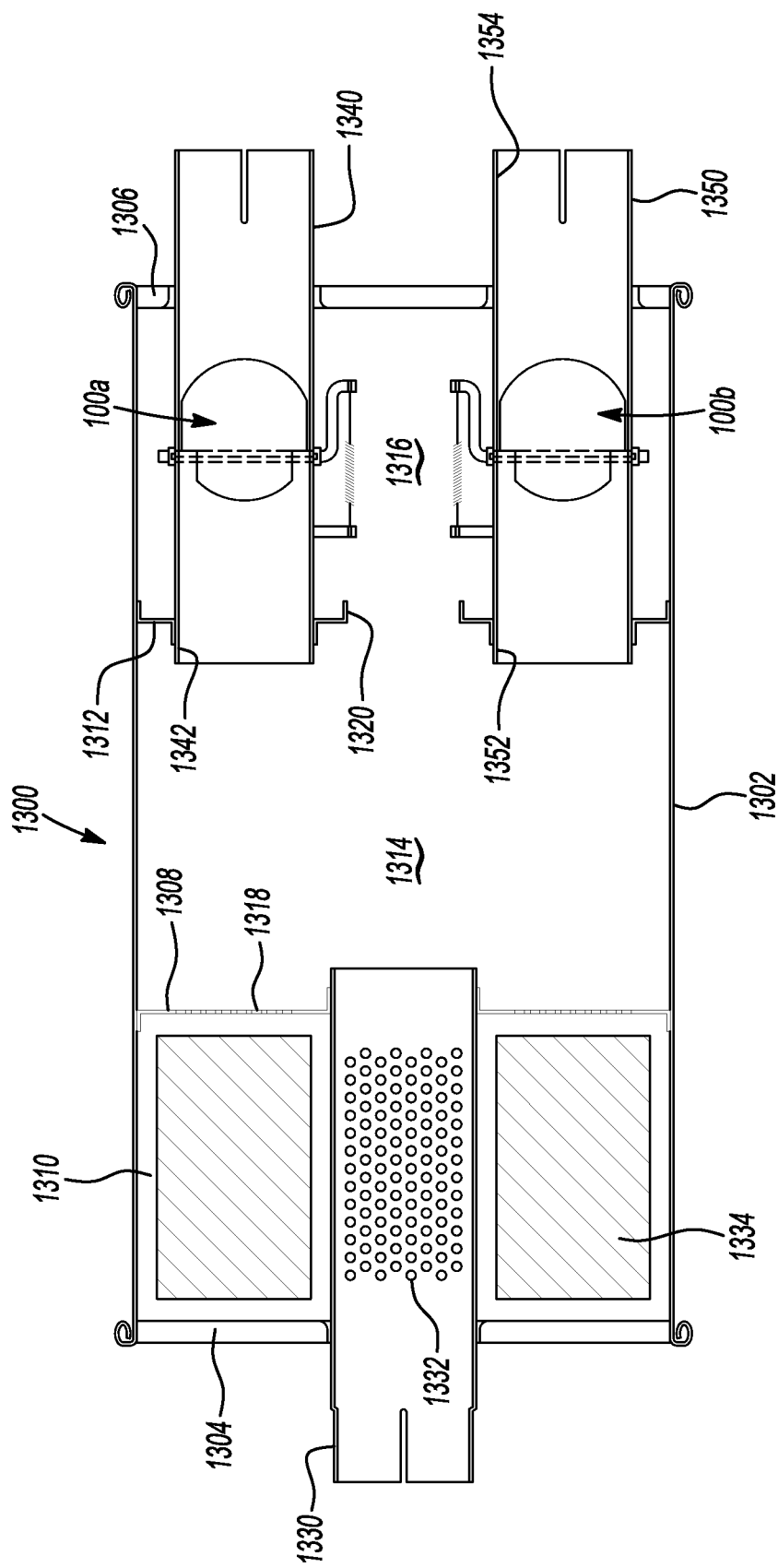
FIG. 13 is a cross-sectional view of another single inlet, dual outlet exhaust muffler.

FIG. 13 depicts a muffler 1300 including a housing 1302 capped by an inlet header 1304 and an outlet header 1306. A first partition 1308 defines a first cavity 1310. A second partition 1312 defines a second cavity 1314 and a third cavity 1316. First partition 1308 includes a plurality of perforations 1318 extending therethrough. An aperture 1320 extends through second partition 1312. As such, each of first cavity 1310, second cavity 1314 and third cavity 1316 are in fluid communication with one another.

An inlet pipe 1330 extends through inlet header 1304 and first partition 1308. A plurality of perforations 1332 extend through the wall of pipe 1330 placing an interior volume of inlet pipe 1330 in fluid communication with first cavity 1310. An insulator such as fiberglass sound absorbing material 1334 is positioned within first cavity 1310. A first outlet pipe 1340 extends through outlet header 1306 and second partition 1312. A first open end 1342 of first outlet pipe 1340 is in fluid communication with second cavity 1314 and spaced apart from inlet pipe 1330. First valve 100*a* is positioned within first outlet pipe 1340. A second outlet pipe 1350 includes a first open end 1352 in fluid communication with second chamber 1314. A second open end 1354 is in fluid communication with the atmosphere. A second valve 100*b* is positioned within second outlet pipe 1350.

Figure 14:
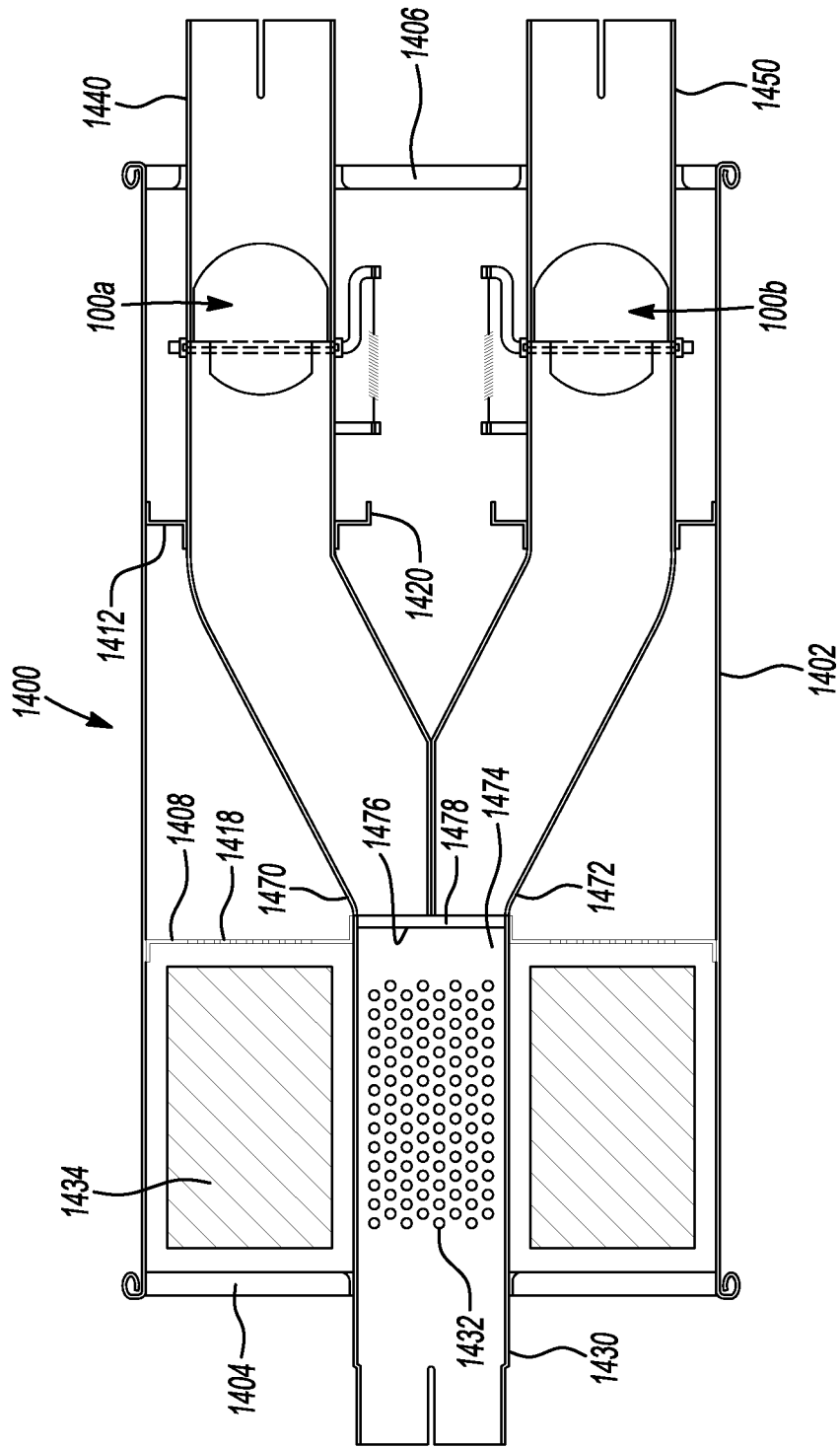
FIG. 14 is a cross-sectional view of another single inlet, dual outlet exhaust muffler.

FIG. 14 depicts another single inlet, dual outlet muffler identified at reference numeral 1400. Muffler 1400 is substantially similar to muffler 1300. As such, like elements will retain their previously introduced reference numerals increased by 100. Muffler 1400 differs from muffler 1300 in that upstream ends 1470 and 1472 of first outlet pipe 1440 and 1450, respectively, are in fluid communication with one another and coupled to an outlet 1474 of inlet pipe 1430. More particularly, an inlet 1476 is formed at the upstream end of first outlet pipe 1440 and is in receipt of exhaust flowing through inlet pipe 1430. Similarly, an inlet 1478 is formed at an upstream end of second outlet pipe 1450 and is in receipt of exhaust flowing through inlet pipe 1430. Inlet 1476 and inlet 1478 are positioned adjacent to one another. In the arrangement depicted in FIG. 14, exhaust may pass through inlet pipe 1430, perforations 1432, sound absorbing material 1434, first partition apertures 1418 and second partition aperture 1420 to entirely fill the cavities defined by housing 1402.

Figure 15:
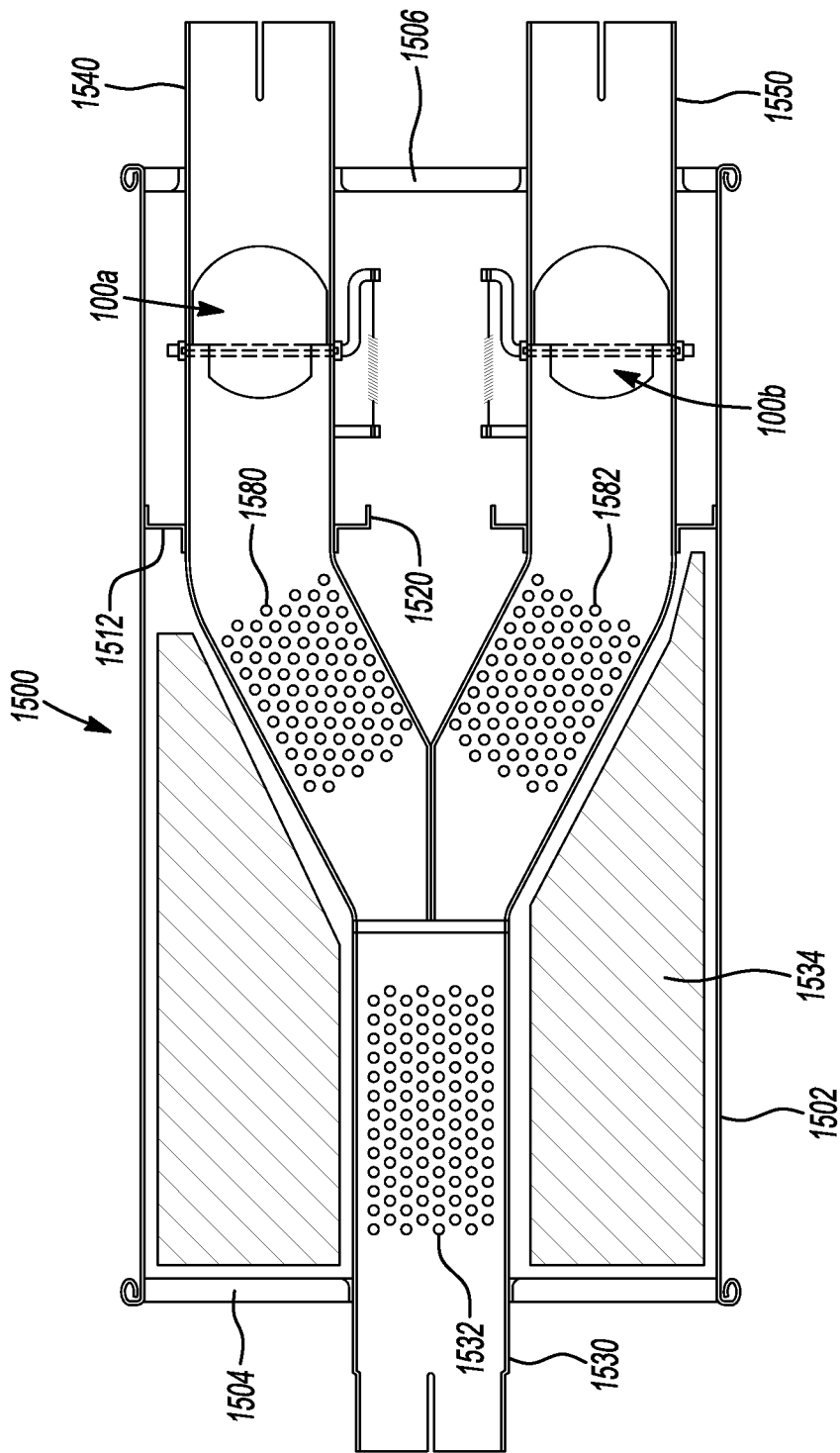
FIG. 15 is a cross-sectional view of another single inlet, dual outlet exhaust muffler.

FIG. 15 depicts another muffler identified at reference numeral 1500. Muffler 1500 is substantially similar to muffler 1400. Accordingly, like elements will be identified with reference numerals increased by 100. Muffler 1500 differs from muffler 1400 in that first perforated partition 1408 is removed and additional perforations 1580 extend through a portion of first outlet pipe 1540 at a location upstream from valve 100*a*. Perforations 1582 extend through second outlet pipe 1550 at a location upstream from valve 100*a*. Sound absorbing material 1534 axially extends a greater distance than sound absorbing material 1434 due to the removal of first partition 1408.

Figure 16:
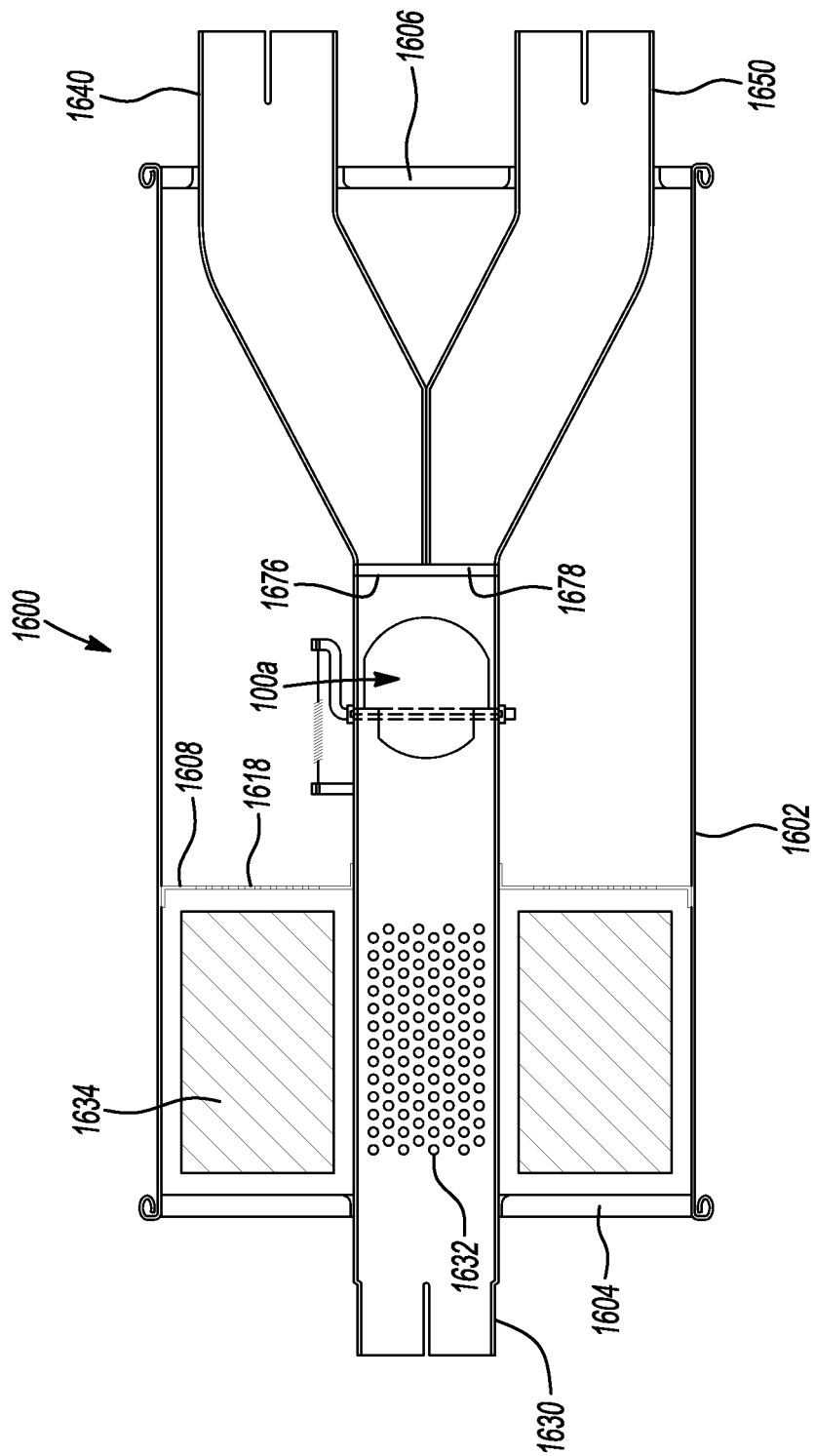
FIG. 16 is a cross-sectional view of another single inlet, dual outlet exhaust muffler.

Referring to FIG. 16, another muffler arrangement is shown at reference numeral 1600. Muffler 1600 shares similar features with muffler 1400. Like elements will be identified with reference numerals increased by 200. Muffler 1600 differs from muffler 1400 in that second partition 1412 is removed and that inlet tube 1630 includes an increased length extending inwardly beyond partition 1608. A singular snap-action valve 108 is positioned at a downstream end of inlet pipe 1630 upstream from an inlet 1676 of first outlet pipe 1640 and an inlet 1678 of second outlet pipe 1650. It should be appreciated that in each of the mufflers shown in FIGS. 12-16, 100% of the exhaust gas flowing through the muffler must pass through the valve or valves 100*a*, 100*b* positioned therein. Furthermore, each of the valves serves to separate substantially constant diameter tail pipe portions of the exhaust system from the relatively enlarged cross-sectional area portions of the muffler to minimize resonant conditions.

The disclosure has been described in conjunction with a detailed description of embodiments disclosed for the sake of example only. The scope and spirit of the disclosure are to be determined from an appropriate interpretation of the appended claims.

What is claimed is:

1. A muffler for an internal combustion engine exhaust system, the muffler comprising:
    a housing having an outer shell and inlet and outlet headers enclosing opposite ends of the shell;
    a partition inside the housing dividing a housing interior into first and second chambers, the first chamber having sound absorbing material positioned therein, the partition having at least one aperture therethrough providing for fluid communication between the first and second chambers;
    a through pipe extending through the inlet and outlet headers and the partition and having a plurality of perforations enabling fluid communication between the through pipe and the first chamber; and
    a valve assembly having a planar valve flap positioned inside the through pipe for rotation with an axle pivotally coupled to the pipe, the valve flap being rotatable between a closed position and an open position whereat a plane of the valve flap is parallel to a longitudinal axis of the through pipe, wherein the valve is positioned downstream of the pipe perforations such that all of an exhaust gas flowing through the muffler passes through the valve regardless of the valve flap position.

2. The muffler of claim 1 wherein the valve separates a downstream portion of the pipe having a first cross-sectional area from a upstream muffler cavity having a second cross-sectional area more than three times the first cross-sectional area.

3. The muffler of claim 1 wherein the valve is positioned adjacent the outlet header.

4. The muffler of claim 1 wherein the valve is positioned axially downstream of the partition and upstream of the outlet header.

5. The muffler of claim 1 wherein the first chamber is bounded by the inlet header and the partition, the second chamber being bounded by the partition and the outlet header.

6. The muffler of claim 1 further including a bias element forcing the valve flap toward the closed position, the bias element mounted exteriorly of the through pipe within the second chamber.

7. The muffler of claim 6 wherein exhaust pressure in the through pipe forces the valve flap to the open position when the exhaust pressure is high enough to overcome bias element force.

8. The muffler of claim 1 wherein the second chamber is devoid of sound absorbing material.

9. The muffler of claim 1 wherein the through pipe passes through the outlet header at a position offset from a central longitudinal axis of the outer shell.

10. The muffler of claim 9 wherein the through pipe passes through the inlet header at a position centered about the central longitudinal axis.

11. The muffler of claim 1 wherein the valve flap in the closed position intersects the longitudinal axis of the through pipe at an acute angle.

12. The muffler of claim 1 wherein an interior volume of the pipe downstream of the valve is isolated from the second chamber by an uninterrupted wall.

13. The muffler of claim 1 wherein the inlet and outlet headers are spaced apart a first distance, the valve axle being spaced from the outlet header a second distance equal to or less than one-quarter the first distance.

14. A muffler for an internal combustion engine exhaust system, the muffler comprising:
    a housing having an outer shell and inlet and outlet headers enclosing opposite ends of the shell;
    a partition inside the housing dividing a housing interior into a first chamber extending from the inlet header to the partition and a second chamber extending from the partition to the outlet header;
    a through pipe extending through the inlet and outlet headers and the partition and having a plurality of perforations enabling fluid communication between the through pipe and the first chamber, the portion of pipe extending through the second chamber being devoid of perforations; and
    a valve assembly having a planar valve flap positioned inside the through pipe for rotation with an axle pivotally coupled to the pipe, the valve flap being rotatable between a closed position and an open position whereat a plane of the valve flap is parallel to a longitudinal axis of the through pipe, wherein the valve is positioned within the second chamber downstream of the pipe perforations to separate the first and second chambers from the pipe downstream of the valve when the valve is closed.

15. The muffler of claim 14 wherein the valve separates a downstream portion of the pipe having a first cross-sectional area from a upstream muffler cavity having a second cross-sectional area more than three times the first cross-sectional area.

16. The muffler of claim 15 wherein the inlet and outlet headers are spaced apart a first distance, the valve axle being spaced from the outlet header a second distance equal to or less than one-quarter the first distance.

17. The muffler of claim 16 further including a bias element forcing the valve flap toward the closed position, the bias element mounted exteriorly of the through pipe within the second chamber.

18. The muffler of claim 17 wherein exhaust pressure in the through pipe forces the valve flap to the open position when the exhaust pressure is high enough to overcome bias element force.

19. The muffler of claim 18 wherein the through pipe passes through the outlet header at a position offset from a central longitudinal axis of the outer shell.

20. The muffler of claim 19 wherein the through pipe passes through the inlet header at a position centered about the central longitudinal axis.

21. A muffler for an internal combustion engine exhaust system, the muffler comprising:
    a housing having an outer shell and inlet and outlet headers enclosing opposite ends of the shell;

an inlet pipe extending through the inlet header;

a first outlet pipe extending through the outlet header;

a second outlet pipe extending through one of the inlet and outlet headers;

a first valve assembly having a planar valve flap positioned inside the first outlet pipe for rotation with an axle pivotally coupled to the first outlet pipe, the valve flap being rotatable between a closed position and an open position whereat a plane of the valve flap is parallel to a longitudinal axis of the first outlet pipe; and a second valve assembly having a planar valve flap positioned inside the second outlet pipe for rotation with an axle pivotally coupled to the second outlet pipe, the valve flap being rotatable between a closed position and an open position whereat a plane of the valve flap is parallel to a longitudinal axis of the second outlet pipe, wherein the first and second valves are positioned such that all of an exhaust gas flowing through the muffler passes through the valves.

22. The muffler of claim 21 further including a partition inside the housing dividing the housing interior into first and second chambers, the first chamber having sound absorbing material positioned therein, the partition having at least one aperture therethrough providing for fluid communication between the first and second chambers.

23. The muffler of claim 22 wherein the inlet pipe, the first outlet pipe and the second outlet pipe each includes a free end within the housing spaced apart from the other free ends.

24. The muffler of claim 22 wherein the first outlet pipe and the second outlet pipe each include upstream ends coupled in fluid communication with a downstream end of the inlet pipe.

25. The muffler of claim 24 wherein portions of the first and second outlet pipes upstream of the valves include perforations.

26. The muffler of claim 21 wherein the inlet pipe includes a plurality of perforations enabling fluid communication between the inlet pipe and an interior of the housing.

27. A muffler for an internal combustion engine exhaust system, the muffler comprising:

a housing having an outer shell and inlet and outlet headers enclosing opposite ends of the shell;

an inlet pipe extending through the inlet header and having a plurality of perforations enabling fluid communication between the inlet pipe and an interior of the housing;

a partition inside the housing dividing a housing interior into first and second chambers, the first chamber having sound absorbing material positioned therein, the partition having at least one aperture therethrough providing for fluid communication between the first and second chambers;

a first outlet pipe extending through the outlet header and having an upstream end coupled in fluid communication with a downstream end of the inlet pipe;

a second outlet pipe extending through the outlet header and having an upstream end coupled in fluid communication with a downstream end of the inlet pipe; and a valve assembly having a planar valve flap positioned inside the inlet pipe for rotation with an axle pivotally coupled to the inlet pipe, the valve flap being rotatable between a closed position and an open position whereat a plane of the valve flap is parallel to a longitudinal axis of the inlet pipe, wherein the valve is positioned such that all of an exhaust gas flowing through the muffler passes through the valve.

\* \* \* \* \*